UNITED STATES PATENT OFFICE.

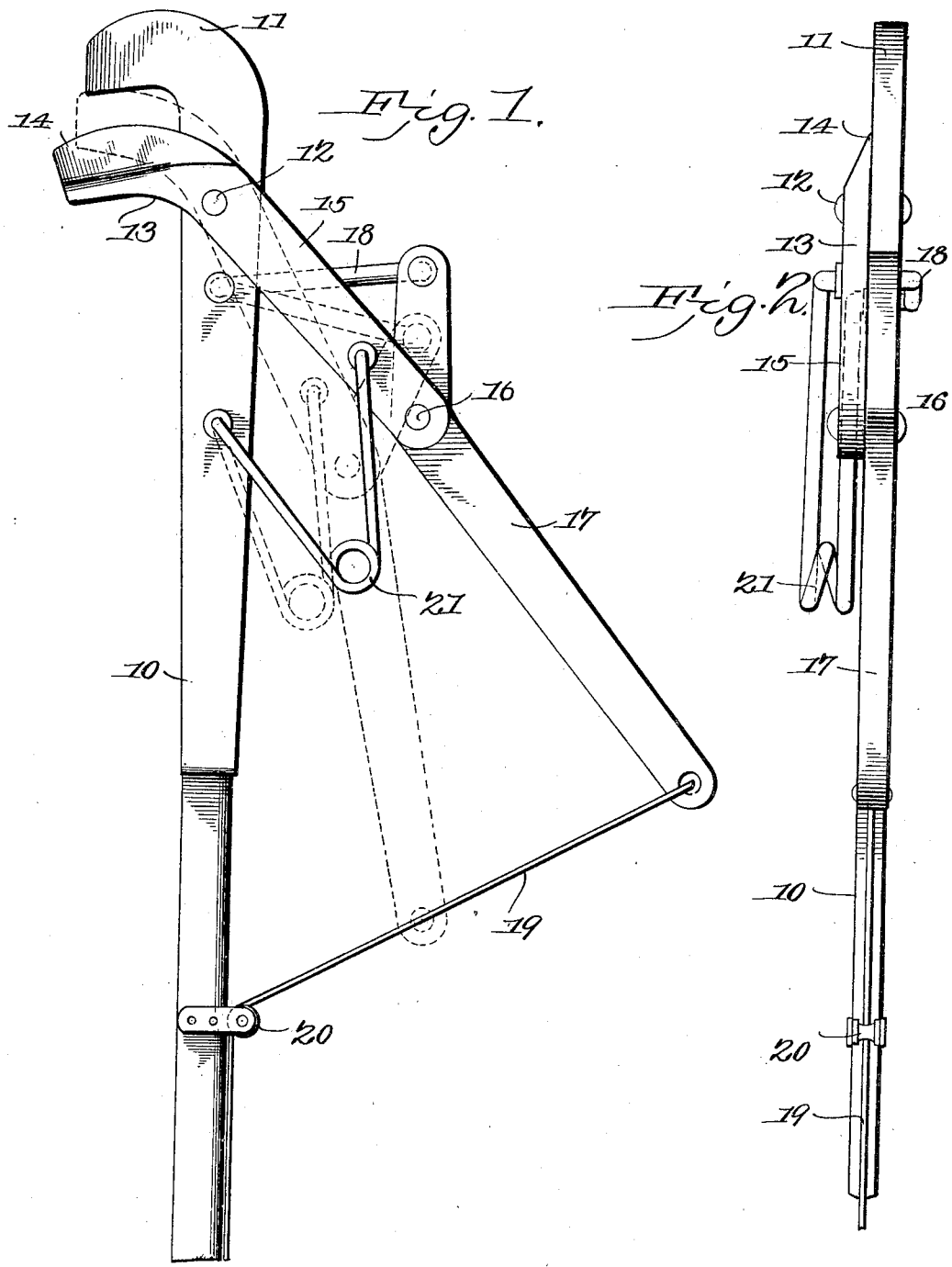

JOHN McNAIR, OF SILOAM SPRINGS, ARKANSAS.

PRUNING IMPLEMENT.

No. 828,764.  Specification of Letters Patent.  Patented Aug. 14, 1906.

Application filed April 4, 1905. Serial No. 253,819.

*To all whom it may concern:*

Be it known that I, JOHN McNAIR, a citizen of the United States, residing at Siloam Springs, in the county of Benton and State of Arkansas, have invented a new and useful Pruning Implement, of which the following is a specification.

This invention relates to implements for pruning and trimming trees, shrubbery, and for similar purposes, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a front elevation, and Fig. 2 is a side elevation, of the improved implement.

The improved implement comprises a handle portion 10 of any required length and provided at one end with a stationary cutting-jaw 11, extending laterally therefrom and inclined to the longitudinal plane of the handle at an angle less than a right angle.

Pivoted at 12 to the handle portion is a blade 13, having a cutting edge 14 for movement over the jaw portion 11 and provided with an extended arm 15, the pivot 12 being located in advance of the inner terminal of the stationary jaw 11 and spaced therefrom so that the cutting-jaw 13 when operated moves first over the outer end of the jaw 11, and thus forces the branch to be severed into a constantly-decreasing area and with a constantly-increasing leverage force.

The inclined position of the jaw 11 relative to the handle 10 aids materially in this action, as the pressure of the movable cutting-jaw causes the branch to be severed to move over a surface inclining away from the direction of movement of the parts. Thus it requires no effort on the part of the operator to hold the implement against the branch while being severed, as the movable jaw member 13 firmly holds the branch into the jaw area while acting upon the same.

The free end of the arm 15 is disposed at an angle to the handle 10 and carries at its extremity a pivot 16, upon which is pivoted the bell-crank lever 17 at its angle. The shorter arm of the lever is connected by a link 18 to the handle 10, and the link is so arranged and positioned that when the longer end of the lever is moved toward the handle or toward a closing position the link is drawn nearer to the pivot 16, thus increasing the leverage.

To the extremity of the longer arm of the lever is connected a draw-cable 19, leading over one or more pulleys 20 and downwardly along the handle 10. A spring 21 is secured between the arm 15 and the handle 10 to maintain the arm 15 and its cutting-blade 13 normally and yieldably in an open or inoperative position.

The handle 10 may be of any required length, and the cable 19 will lead through suitable guide-pulleys, as at 20, to a point convenient to the hand of the operator.

It will thus be obvious that a very strong compound leverage may be imparted to the cutting-blade 13 to sever whatever object may be placed between it and the stationary jaw 11. Thus the smaller branches of trees, twigs, runners, and similar growths may be quickly and effectively severed, and the cutting-blade will be automatically restored to its former position by the action of the spring 21.

The construction is very simple, is strong and durable, contains few parts, and can therefore be inexpensively manufactured, and all the parts coöperate effectually to produce the desired results.

In using the implement it will be desirable to place it upon the branch to be severed with the stationary portion 11 outside or next to the part to be severed, so that if any bruising of the branch occurs it will come upon the severed portion and not on the part remaining upon the tree.

Having thus described the invention, what is claimed is—

1. A pruning implement comprising a pivoted handle and arm provided with opposed cutting-jaws, a bell-crank lever pivoted at its angle to the extremity of the arm and a link connecting the shorter arm of the lever and the handle.

2. A pruning implement comprising a crossed and pivoted handle and arm provided with opposed cutting-jaws and with the extremity of the arm disposed at an angle to the handle, a resilient member joining the arm and handle and arranged to hold the jaws normally open, a bell-crank lever pivoted at its angle to the extremity of the arm and a link connecting the shorter arm of the lever and the handle and so arranged that when the longer arm of the lever is moved to close the link is drawn nearer the pivot to increase the leverage.

3. A pruning implement comprising a handle provided with a rigid angularly-disposed jaw, a knife pivoted to the said handle and arranged for coöperation with the jaw and provided with an arm disposed at an angle to the handle, a bell-crank lever pivoted to the extremity of the arm and a link connecting the lever and the handle and so positioned that a closing movement of the lever draws the link nearer to the pivot and increases the leverage.

In testimony that I claim the foregoing as my own I have hereto affixed my signature in the presence of two witnesses.

JOHN McNAIR.

Witnesses:
A. O. WRIGHT,
H. L. ATKENS.